J. B. McINTEE & I. BOWMAN.
GLASS POT.
APPLICATION FILED FEB. 2, 1912.
1,032,923.
Patented July 16, 1912.
2 SHEETS—SHEET 2.
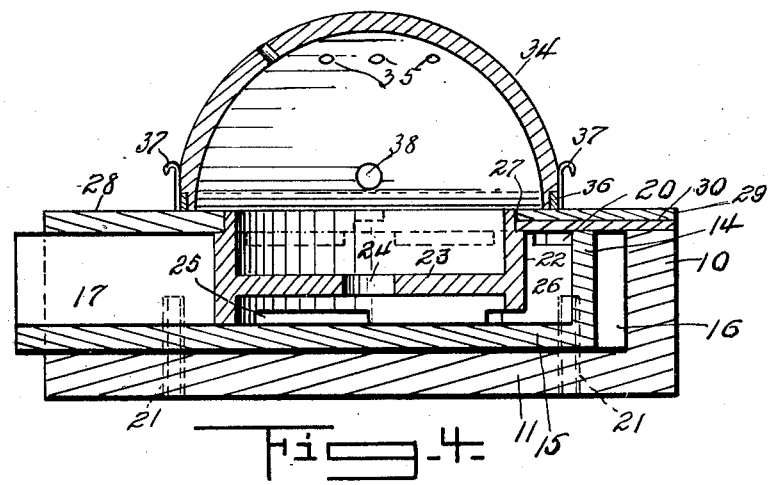
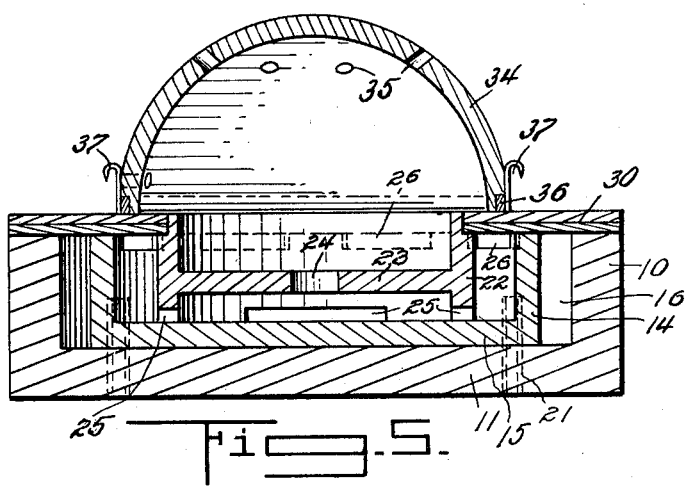
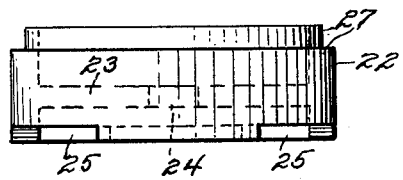
WITNESSES
INVENTORS

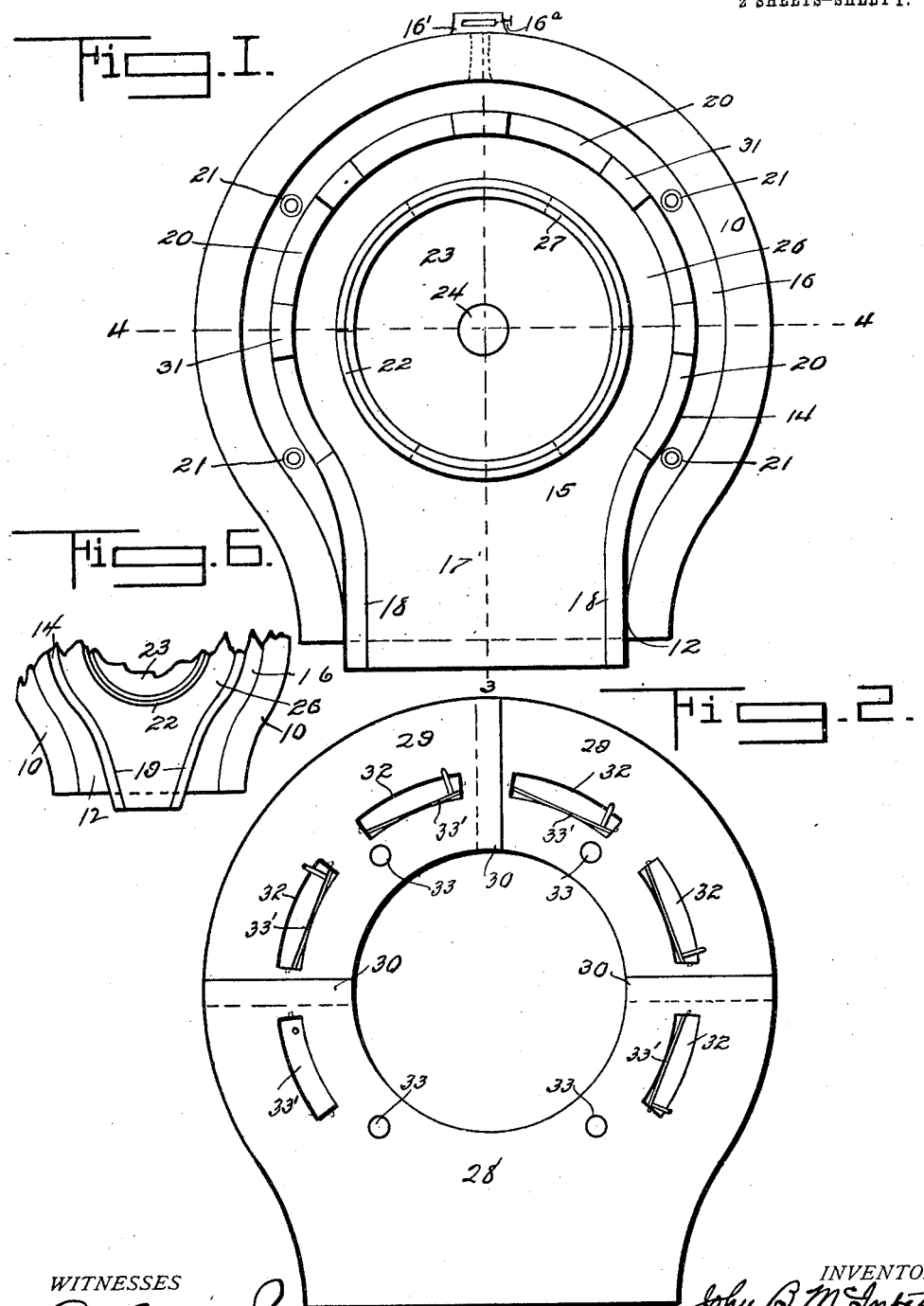

UNITED STATES PATENT OFFICE.

JOHN B. McINTEE AND ISAAC BOWMAN, OF JEANNETTE, PENNSYLVANIA.

GLASS-POT.

1,032,923.  Specification of Letters Patent.  Patented July 16, 1912.

Application filed February 2, 1912. Serial No. 674,943.

*To all whom it may concern:*

Be it known that we, JOHN B. McINTEE and ISAAC BOWMAN, citizens of the United States, residing at Jeannette, in the county of Westmoreland and State of Pennsylvania, have invented certain new and useful Improvements in Glass-Pots, of which the following is a specification.

This invention relates to certain new and useful improvements in glass pots, and has for its main object to provide a pot in which the molten glass may be kept at a uniform temperature while being drawn for blowing.

A further object of the invention is to provide a pot in which provision is made for heating the molten glass fed thereto and maintaining same in proper condition for blowing.

With the above and other objects in view, as will more fully appear as the invention is hereinafter described in detail, the invention consists of the novel construction, combination and arrangement of parts as will be described, and as shown in the accompanying drawings, in which:

Figure 1 is a top plan view of a tank constructed in accordance with our invention, the cover plate and dome being removed. Fig. 2 is a top plan view of the cover plate. Fig. 3 is a longitudinal sectional view taken on the line 3—3 of Fig. 1. Fig. 4 is a cross-sectional view taken on the line 4—4 of Fig. 1. Fig. 5 is a view in side elevation of the inner or drawing pot, and, Fig. 6 is a plan view of a portion of the pot with the cover plate removed, showing a modified form of throat for the outer or conveying pot.

A glass pot in accordance with this invention comprises an outer or conveying pot and an inner or drawing pot mounted within and spaced from the outer or conveying pot, the two pots being mounted within a suitable furnace. The furnace and the conveying pot are substantially similar in configuration, being circular for the major portion of their circumference, and terminating at one side in a throat, the throat of the conveying pot receiving the molten glass which is fed thereto in any suitable manner from a tank or other source of supply.

In the embodiment of our invention herein illustrated, the furnace comprises a wall 10 and a bottom 11, the same being constructed of any refractory material, such as commonly employed in the building of furnaces to withstand great heat, and the furnace having a general circular outline, opening at one side in the throat 12.

The outer or conveying pot is mounted upon the bottom 11 of the furnace and comprises side walls 14 and a bottom 15, the side walls having a general circular contour similar to the side walls of the furnace and being spaced from the side walls of the furnace to provide a heating chamber 16. The outer or conveying pot terminates in one side in a throat 17, the side walls 18 of which may be sufficiently spaced apart so that they engage the side walls of the throat 12 of the furnace as shown in Fig. 1 of the drawings, or the side walls of said throat 7 may be contracted as shown at 19 in Fig. 6 of the drawings, so as to reduce the size of the throat. No means is shown herein for closing the throat of the outer or conveying pot in the form shown in either of the drawings, or for closing the heating chamber 16 at its throat where the construction is as shown in Fig. 6 of the drawings, since any approved means may be employed for this purpose and forms no part of our invention. The upper edge of the side walls 14 of the outer or conveying pot is provided with cut-away portions 20 at spaced intervals, which provide passages that permit the flames and the heat within the chamber 16 to pass through into the chamber within the outer or conveying pot so as to heat the inner pot and maintain the molten glass therein at an even temperature, as will more fully hereinafter appear. The heating chamber 16 communicates with a stack 16′ preferably located opposite to the throat of the pot and which provides for a circulation of the heat and removal of the fumes. A suitable damper 16ª is provided in such stack.

Arranged in the heating chamber 16 at as many points as may be desired, are gas supply pipes 21, on the inner ends of which suitable burners (not shown) are usually provided. Arranged within the outer or conveying pot is a circular inner or drawing pot 22 provided a slight distance above its lower edge with a horizontal partition 23 having a central feed opening 24. The lower edge of the wall of the pot 22 is provided with a plurality of feed openings 25 which establish communication between the space 26 that is between the outer and inner pots, with the inner pot below the partition 23 and through the opening 24 with the space within the inner pot above said partition 23.

The said inner pot is circumferentially rabbeted around its upper edge as at 27 to provide a supporting shoulder for the cover plate of the pot, the reduced upper edge of the inner pot being received within a central opening in the cover plate, and the top face of said upper edge of the inner pot being flush with the upper face of said cover plate.

The cover plate is in outline or plan of a form similar to the furnace and the outer or conveying pot, and is generally formed of two or more sections, the present embodiment thereof illustrating a front section 28 and two segmental sections 29, the sections being formed with lap ends as 30 so as to fit neatly together, and have the upper face of the plate as a whole on the same plane. This plate is preferably formed in sections in order that should one section thereof be broken, another section can be readily supplied without necessitating an entire new cover plate, and also for convenience in handling the cover plate when desired. Said cover plate rests flush on the top edge of the furnace walls 10 and on the projections 31 on the upper edge of the outer or conveying pot that are formed by providing the passages 20. At points corresponding to the location of the passages 20 in the upper edge of the outer or conveying pot, the cover plate is provided with openings 32 in which are hung dampers 33' which may be swung down so as to largely close the passages 20 when it is desired to shut off the heat passing into the chamber 26 at any desired point or points around the furnace. The cover plate is also provided at suitable points around its inner circumference with openings 33 which allow the heat to ascend inside the hood and be deflected by the latter down upon the glass within the inner pot 22 to assist in keeping the molten glass within the inner pot from being chilled on the top or exposed surface.

Mounted on the cover plate above described is a dome or cover 34 provided near its top with one or more vent openings 35, and which dome or cover is provided at its lower open or enlarged end with a metal band 36 to which are attached strap hooks 37 so that connection can be readily made with a crane or other suitable device for lifting the dome and swinging it out of the way when it is desired to draw the glass for blowing. This dome is provided at one or more points near its lower or open end with openings 38 through which a burner pipe may be introduced if desired so as to be positioned over the open upper end of the inner pot.

The molten glass to be drawn is fed to the chamber 26 through the throat 17, the outer or conveying pot being kept heated by the gas burners in chamber 16, the heat and flame passing through the passages 20 so as to impinge against the walls of the inner pot 22. The molten glass flows through openings 25 into the space beneath the horizontal partition 23 and up through opening 24 into the chamber of the inner pot 22, the blow iron being introduced into the glass at the open upper end of the inner pot. Should it be desired to maintain the glass in its molten state for some time, it will be evident that with the dome placed over the inner pot, the heat is confined so as to maintain the desired state of the glass, and danger of the same chilling is obviated.

The molten glass being fed into the inner pot through central opening 24, and the blow iron being introduced into the inner pot in the center directly above said opening 24, the glass received on the blow iron is practically free from flaws, blisters and other impurities, such as gravel, etc., which flow toward the rim of the inner pot as the glass rises therein. A continuous flow of glass to the inner pot is maintained, the level of the glass in the inner pot being always in conformity with the level of the glass in chamber 26, and the walls of the outer pot being kept heated with provision for the heat and flames passing over the top of the glass in chamber 26 and engaging the wall of the inner pot, serves to maintain the glass at all times in a uniform temperature suitable for drawing.

While we have herein illustrated and described in detail the construction of a partial embodiment of the invention, it will be evident that various changes may be made in the details of construction, without departing from the spirit or scope of the invention as claimed.

Having fully described our invention, what we claim as new and desire to secure by Letters Patent of the United States is:—

1. In a glass pot, a receiving furnace, a receiving and conveying pot mounted therein and having passage ways in the upper edge, a drawing pot mounted within the conveying pot and having an apertured partition located above the lower edge of the pot, the walls of said drawing pot having openings below said partition establishing communication with the conveying pot, a cover plate supported on said pots and on the furnace walls and having an opening receiving the upper end of the drawing pot, said cover plate provided with openings registering with the space between the conveying pot and the furnace walls and opposite the passage ways in the upper edge of the conveying pot, and dampers in said openings controlling said passage ways.

2. In a glass pot, an outer or conveying pot having passage ways in the upper edge thereof, a circular inner or drawing pot mounted within the outer pot and having a horizontal partition intermediate its upper and lower edges, said partition provided with a central opening, the lower edges of said inner pot having cut-away portions establishing communication between the inner pot and the outer pot, a cover plate for said pots having a central opening receiving the upper end of the inner pot, and a removable dome supported when in position by said cover plate and inclosing the inner pot.

3. In a glass pot, a furnace, heating means therefor, a conveying pot located within the the furnace, a cylindrical inner pot arranged within the conveying pot and spaced from the walls thereof, said inner pot having openings in its lower edge establishing communication with the conveying pot and having a partition located above its upper edge and provided with a central opening, the walls of the conveying pot having passage ways establishing communication between the heating chamber of the furnace and the space between the conveying pot and the inner pot, and a cover plate covering the space between the inner pot and conveying pot and the heating chamber of the furnace.

In testimony whereof we affix our signatures in presence of two witnesses.

JOHN B. McINTEE.
ISAAC BOWMAN.

Witnesses:
E. C. CURRY,
H. V. ROWAN.

Copies of this patent may be obtained for five cents each, by addressing the "Commissioner of Patents, Washington, D. C."